(12) United States Patent
Luo et al.

(10) Patent No.: US 10,480,595 B2
(45) Date of Patent: Nov. 19, 2019

(54) CONICAL SURFACE FRICTION TYPE OVERRUNNING CLUTCH

(71) Applicant: Chongqing DynRun Machinery Co., Ltd., Chongqing (CN)

(72) Inventors: Jun Luo, Chongqing (CN); Jin Liu, Jiangsu (CN)

(73) Assignee: CHONGQING DYNRUN MACHINERY CO., LTD., Chongqing (CN)

( * ) Notice: Subject to any disclaimer, the term of this patent is extended or adjusted under 35 U.S.C. 154(b) by 242 days.

(21) Appl. No.: 14/413,546

(22) PCT Filed: Jun. 13, 2013

(86) PCT No.: PCT/CN2013/077149
§ 371 (c)(1),
(2) Date: Jan. 8, 2015

(87) PCT Pub. No.: WO2014/015719
PCT Pub. Date: Jan. 30, 2014

(65) Prior Publication Data
US 2015/0204394 A1    Jul. 23, 2015

(30) Foreign Application Priority Data

Jul. 27, 2012 (CN) .......................... 2012 1 0263358

(51) Int. Cl.
*F16D 41/00* (2006.01)
*F16D 13/00* (2006.01)
(Continued)

(52) U.S. Cl.
CPC ........... *F16D 41/061* (2013.01); *F16D 41/06* (2013.01); *F16D 41/22* (2013.01); *F16D 13/28* (2013.01)

(58) Field of Classification Search
None
See application file for complete search history.

(56) References Cited

U.S. PATENT DOCUMENTS 852,587 A * 5/1907 Towler .................... F16D 41/22
192/41 R
1,989,361 A  1/1935 Ingemarson
(Continued)

FOREIGN PATENT DOCUMENTS

CN   2175321 Y   8/1994
CN   2479288 Y   2/2002
(Continued)

OTHER PUBLICATIONS

Japanese Office Action dated Feb. 9, 2016 from corresponding Japanese Application No. JP 2015-523384, 6 pages.
(Continued)

*Primary Examiner* — Charles A Fox
*Assistant Examiner* — Ryan P Dodd
(74) *Attorney, Agent, or Firm* — Ohlandt, Greeley, Ruggiero & Perle, LLP

(57) ABSTRACT

A conical surface friction type overrunning clutch includes a first intermediate ring and a second intermediate ring which are provided between an inner ring and an outer ring, and force amplifying transmission mechanisms are connected respectively to conical surface friction pairs. All of the force amplifying transmission mechanisms and the conical surface friction pairs operate within a parameter scope in which they would not lock themselves, the force amplifying transmission mechanisms are in a constant engaged state, and the conical surface friction pairs exert an initial press via an elastic pre-tightening part or a magnetic member. When tangential external component forces in different directions are generated between the inner ring and the outer ring, the conical surface friction pairs are sliding or stay in a station-
(Continued)

ary state under the action of the force amplifying transmission mechanism, thus the functions of overrunning and self-locking of the overrunning clutch are realized.

12 Claims, 8 Drawing Sheets

(51) Int. Cl.
  *F16D 13/28* (2006.01)
  *F16D 41/061* (2006.01)
  *F16D 41/06* (2006.01)
  *F16D 41/22* (2006.01)

(56) References Cited

U.S. PATENT DOCUMENTS

| | | | | |
|---|---|---|---|---|
| 3,368,834 | A | * | 2/1968 | Stratienko ............ F16D 1/0829 192/45.1 |
| 3,904,004 | A | * | 9/1975 | Marx ...................... F16D 41/22 192/113.36 |
| 4,194,402 | A | * | 3/1980 | De Nicola ............... G01N 3/04 73/859 |
| 4,367,053 | A | * | 1/1983 | Stratienko ............... F16D 1/094 403/371 |
| 4,400,996 | A | * | 8/1983 | Schou ..................... F16D 41/22 475/241 |
| 4,782,720 | A | * | 11/1988 | Teraoka .................. F16D 41/22 192/35 |
| 5,299,676 | A | * | 4/1994 | Wade ..................... B65G 23/26 188/134 |
| 8,220,598 | B2 | * | 7/2012 | Valembois ............... F16F 7/023 188/129 |
| 2004/0104106 | A1 | | 6/2004 | Peter |
| 2011/0180362 | A1 | * | 7/2011 | Swanson ............... F16D 25/082 192/66.1 |
| 2012/0103743 | A1 | * | 5/2012 | Hong .................... F16D 41/063 192/45.1 |
| 2013/0150191 | A1 | | 6/2013 | Ishida |

FOREIGN PATENT DOCUMENTS

| | | | |
|---|---|---|---|
| CN | 1262770 | | 7/2006 |
| CN | 10193646 | A | 1/2011 |
| CN | 101936346 | A | 1/2011 |
| CN | 201747821 | U | 2/2011 |
| CN | 102016353 | A | 4/2011 |
| CN | 102562859 | A | 7/2012 |
| CN | 102562860 | A | 7/2012 |
| CN | 102758859 | A | 10/2012 |
| CN | 102758860 | A | 10/2012 |
| CN | 102927157 | A | 2/2013 |
| CN | 202746454 | U | 2/2013 |
| CN | 202914580 | U | 5/2013 |
| DE | 2023316 | A1 * 12/1971 | ............ F16C 35/073 |
| DE | 3541657 | A1 | 5/1987 |
| EP | 1408522 | A1 | 4/2004 |
| JP | 49-111056 | A | 10/1974 |
| JP | 08-338452 | A | 12/1996 |
| JP | H11287261 | A | 10/1999 |
| JP | 2001-304303 | A | 10/2001 |
| JP | 2006097888 | A | 4/2006 |
| JP | 2012-52576 | A | 3/2012 |
| SU | 100852 | A1 | 11/1954 |
| SU | 1059308 | A1 | 12/1983 |

OTHER PUBLICATIONS

Russian Office Action dated Mar. 30, 2016 from corresponding Russian Application No. 2015105759/11.
International Search Report dated Sep. 26, 2013 corresponding to PCT/CN2013/077149, 12 pp.
Written Opinion dated Sep. 26, 2013 corresponding to PCT/CN2013/077149 , 12 pp.
Jizheng, et al., The Current Conditions and Development Expectation of Overrunning Clutch, 1994-2009 China Academic Journal Electronic Publishing House, pp. 398-403.

* cited by examiner

CONICAL SURFACE FRICTION TYPE OVERRUNNING CLUTCH

This application is the national phase of International Application No. PCT/CN2013/077149, titled "CONICAL SURFACE FRICTION TYPE OVERRUNNING CLUTCH", filed on Jun. 13, 2013, which claims the benefit of priority to Chinese Patent Application No. 201210263358.4 titled "CONICAL SURFACE FRICTION TYPE OVERRUNNING CLUTCH", filed with the Chinese State Intellectual Property Office on Jul. 27, 2012, entire disclosure of both applications are incorporated herein by reference.

TECHNICAL FIELD

The present application relates to overrunning clutch devices in the field of mechanical power transmission and particularly to a conical surface friction type overrunning clutch, which is a basic functional component widely used in mechanical transmission.

BACKGROUND

In the conventional techniques of overrunning clutches, two kinds of overrunning clutches are most widely used, which include a roller type overrunning clutch and a wedge type overrunning clutch which both employ a principle using inclined surfaces for wedge joint. The above two kinds of overrunning clutches mainly have the following defects. 1. All the contacts are discrete higher pair contacts, and the contact stress is very high in a wedged state, resulting in a very small bearing capacity, thus the contact pair wears fast, and has a short service life. 2. Since the discrete contact pair is used, a situation that discrete members cannot operate synchronously is apt to occur, which is extremely apt to cause partial damages that will in turn cause failures or malfunctions of dead lock or failing in self-lock. 3. There is nearly no automatic wear compensation capacity. 4. In an overrunning state, the resistance is large, and the efficiency is not high. 5. A great releasing force is required for removing the wedged connection. 6. The slipping angle is large. 7. The structure is complex and has a large number of parts, which imposes very high consistency requirements on both materials and manufacture process, thus the cost is high. 8. Due to the large number of discrete members, at a high rotational speed, the working performance is poor, especially in a high rotational speed overrunning state, both noise and abrasion are large.

The above defects in the conventional technology seriously impact the scope of application of the overrunning clutch. Reference is made to an article of "The Status and Trend of Development of Overrunning Clutch" written by Zhang Jizheng, and et al. (which is published in *collection of the third China-Japan International Academic Conference on History of Mechanical Technology* on Oct. 28, 2002, the publisher of which is Chinese mechanical engineering society). It may be learnt from the contents of the article that, the domestic scholars and experts have made lots of improvements and researches and inventions, and have made good achievements, but there is still a big gap to achieve requirements of the overrunning clutch such as ideal performance, structure, reliability, cost and service life.

Document CN2175321Y discloses a one-way clutch based on screw thread pair and conical surface friction pair, however, did not disclose the condition for realizing self-lock.

Document CN2479288Y discloses a one-way overrunning clutch based on inclined slot shaft pin and conical surface friction pair, and in addition to the drawbacks similar to those of the document CN2175321Y, the clutch has a defect of low bearing capacity.

Documents CN201747821 U and CN 101936346 A disclose a spatial wedge joint type friction overrunning clutch, and as described in the documents, "it is designed on basis of a novel technology principle", however, in one aspect, "the novel technology principle" is not clarified in the document; and in another aspect, the clutch according to these two documents selects a structure using a friction pair of a guide mechanism to realize self-lock, which greatly limits the improvements of the structure design, the unlocking performance and bearing capacity of the overrunning clutch.

SUMMARY

In order to solve the deficiencies in the background technology, technical solutions of the present application provide a conical surface friction type overrunning clutch with a novel structure to achieve the following objects:

(1) overcoming the defects in the conventional design, and greatly improving various performance indexes of the overrunning clutch;

(2) achieving an overrunning clutch with overloading protection function by adjusting design parameters; and (3) making the overrunning clutch have a simper structure, a lower cost and being more easily to manufacture.

In order to achieve the above objects, the following technical solutions are provided according to the present application.

A conical surface friction type overrunning clutch includes: a first intermediate ring and a second intermediate ring for transmitting force (or an intermediate ring assembly), a working friction pair elastic pre-tightening member (or an elastic pre-tightening assembly), an inner ring (or an inner ring assembly), and an outer ring (or an outer ring assembly);

the inner ring, the outer ring, the first intermediate ring and the second intermediate ring have a common rotation axis;

the first intermediate ring and the second intermediate ring are both located between the inner ring and the outer ring; the first intermediate ring and the second intermediate ring each cooperates with one of the inner ring and the outer ring via conical surfaces, to respectively form at least one first working friction pair and at least one second working friction pair which are both axially engageable and disengageable; and a first force amplifying transmission mechanism and a second force amplifying transmission mechanism are respectively formed between the first intermediate ring and the other one of the inner ring and the outer ring and between the second intermediate ring and the other one of the inner ring and the outer ring, and the first intermediate ring and the second intermediate ring are respectively connected to the other one of the inner ring and the outer ring via the first force amplifying transmission mechanism and the second force amplifying transmission mechanism;

the elastic pre-tightening member has one end arranged on the first intermediate ring or the second intermediate ring, to allow all the working friction pairs to maintain an elastic pressing force which meets a working requirement when the working friction pairs are not working;

the first working friction pair and the second working friction pair have a common rotation axis, and two conical surfaces of each working friction pair that cooperate with each other have equal cone apex angles; for the cone apex angle of any one of the working friction pairs, the cone apex angle referred to as θ and a friction coefficient of the friction pair referred to as $\mu_0$ must satisfy a condition of 2 arctan $(\mu_0)<\theta \leq 180°$, wherein arctan( ) in the formula represents arctangent function, and the condition is to ensure that self lock of the working friction pair will not occur;

at least one of the force amplifying transmission mechanisms is configured to convert a relative rotation angle between the respective intermediate ring and the inner ring or the outer ring which is connected to the force amplifying transmission mechanism to an axial relative displacement, and in a case that the relative rotation angle is Φ, and the generated axial relative displacement is λ, and the friction coefficient of the force amplifying transmission mechanism is $\mu_1$, a condition of arctan(dλ/dΦ)>arctan($\mu_1$) must be satisfied, wherein arctan( ) in the formula represents arctangent function, and d represents differential, and the condition is to ensure that self lock of the force amplifying transmission mechanism will not occur; and in a case that the first working friction pair and the second working friction pair are converted to a theoretically equivalent working friction pair, a tangential external component force in a direction of self lock occurred between the inner ring and the outer ring is $F_1$, and a normal pressure generated on the equivalent working friction pair by an action of the force amplifying transmission mechanism is $F_2$, an equivalent friction coefficient of the equivalent working friction pair is μ, and a design condition for the overrunning clutch to realize a maximum bearing capacity is $dF_1/dF_2 \leq \mu$; and a design condition for the overrunning clutch to achieve overload slipping protection is $dF_1/dF_2 > \mu$, wherein d in the formula represents differential.

The above conditions constitute one of aspects of the present application, in detail, a one-way self-lock function which is required by an overrunning clutch is achieved by the interaction of various mechanical structures each of which does not lock itself. In addition, according to the present application, in the whole scope of the bearing capacity, the overrunning clutch will not generate an additional unlocking wedging force in the unlocking process which is consequentially caused by the individual self-locking mechanism in the conventional technology, thus the overrunning clutch in the present application not only makes the unlocking process simple, but also eliminates a failure mode of being unable to unlock occurred in the conventional technology.

In the present application, the force amplifying transmission mechanism can be constituted by various common mechanical transmission mechanisms which are capable of converting a relative rotation to an axial relative displacement, and which include but not limited to: various screw thread pairs having a standard or a nonstandard cross section, a helical matching surface, an inclined wedged matching surface, a helical groove-pin mechanism, an end cam transmission mechanism, an inclined support bar transmission mechanism, and etc.

In the present application, the force amplifying transmission mechanism can not only be optimally designed as a configuration which can convert the relative rotating movement in different directions to an axial movement, for example a screw thread pair structure, but also be simplified as a configuration which can convert a relative rotating movement only in one direction to an axial movement, for example, an end cam transmission mechanism and etc.

In the present application, the force amplifying transmission mechanism may have the following structures, such as a screw thread pair, helical surfaces, inclined wedging surfaces, and an end cam transmission mechanism which all have directly engaged surfaces, and the engaged surfaces are respectively formed on one of an end surface, an inner circumferential surface and an outer circumferential surface of the force transmission intermediate ring assembly, and one of an axial surface, an inner circumferential surface, and an outer circumferential surface of one of the inner ring and the outer ring.

In the present application, the overrunning clutch further includes a position restricting assembly connected to the inner ring and the outer ring, to restrict a radial relative position and an axial relative position between the inner ring and the outer ring, the position restricting assembly can be various roller bearings, sliding bearings, hydraulic bearings and etc. At least one position restricting assembly is connected to the inner ring and the outer ring, to restrict or limit a radial relative position and an axial relative position between the inner ring and the outer ring. The position restricting assembly can be arranged directly between the inner ring and the outer ring of the overrunning clutch, and can also be arranged between parts of external mechanism which are connected to the inner ring and the outer ring of the overrunning clutch.

Further, the synchronizing mechanism can be constituted by straight teeth or splines which are provided on end surfaces, inner circumferential surfaces, or outer circumferential surfaces of the two intermediate rings and are engaged with each other, or can be constituted by a cylindrical pin connecting with holes on the end surfaces of the two intermediate rings, or can be constituted by straight teeth or splines provided on inner circumferential surfaces or outer circumferential surfaces of the two intermediate rings engaging with a circular ring which is provided with straight teeth or splines on an inner circumferential surface or an outer circumferential surface.

Each of the working friction pairs may be a structure constituted by two friction surfaces which are formed by solely two conical surfaces cooperating with each other, and also may be a structure constituted by more than two friction surfaces formed by conical surfaces staggeredly stacked according to a configuration of a conventional multi-plate clutch.

The elastic pre-tightening member includes at least one elastic element made by elastic material such as metal or rubber, and the structure of the elastic element includes a torsion spring, a pressing spring, a disc spring, a wave spring and a leaf spring.

Further, the friction surfaces of the working friction pairs are provided with groove shaped or reticulate pattern shaped lubrication oil channels.

In the present application, according to requirements or limitations of factors such as the application environment, performance requirement, volume size, and manufacture process, various assemblies of the overrunning clutch may be embodied as a single integral part fulfilling the assembly function, or as a structure formed by multiple parts assembled and connected according to common mechanical principles to fulfill the assembly function. The inner ring according to the present application further includes another assembly which is connected to the inner ring and rotates together with the inner ring, thereby forming an inner ring assembly; and the outer ring according to the present application further includes another assembly which is connected to the outer ring and rotates together with the outer ring, thereby forming an outer ring assembly.

Another kind of conical surface friction type overrunning clutch according to the present application includes: an inner ring, an outer ring, a first intermediate ring and a second intermediate ring;

the inner ring, the outer ring, the first intermediate ring and the second intermediate ring have a common rotation axis;

the first intermediate ring and the second intermediate ring are both located between the inner ring and the outer ring; the first intermediate ring and the second intermediate ring each cooperates with one of the inner ring and the outer ring via conical surfaces, to respectively form at least one first working friction pair and at least one second working friction pair which are both axially engageable and disengageable; and a first force amplifying transmission mechanism and a second force amplifying transmission mechanism are respectively formed between the first intermediate ring and the other one of the inner ring and the outer ring and between the second intermediate ring and the other one of the inner ring and the outer ring, and the first intermediate ring and the second intermediate ring are respectively connected to the other one of the inner ring and the outer ring via the first force amplifying transmission mechanism and the second force amplifying transmission mechanism;

an accommodating space for accommodating a magnetic member is provided between the first intermediate ring and the second intermediate ring, to allow all the working friction pairs to maintain an elastic pressing force which meets a working requirement when the working friction pairs are not working;

the first working friction pair and the second working friction pair have a common rotation axis, and two conical surfaces of each working friction pair that cooperate with each other have equal cone apex angles; for the cone apex angle of any one of the working friction pairs, the cone apex angle referred to as $\theta$ and a friction coefficient of the friction pair referred to as $\mu_0$ must satisfy a condition of $2 \arctan(\mu_0) < \theta \leq 180°$, wherein $\arctan(\ )$ in the formula represents arctangent function, and the condition is to ensure that self lock of the working friction pair will not occur;

at least one of the force amplifying transmission mechanisms is configured to convert a relative rotation angle between the respective intermediate ring and the inner ring or the outer ring which is connected to the force amplifying transmission mechanism to an axial relative displacement, and in a case that the relative rotation angle is $\Phi$, and the generated axial relative displacement is $\lambda$, and the friction coefficient of the force amplifying transmission mechanism is $\mu_1$ a condition of $\arctan(d\lambda/d\Phi) > \arctan(\mu_1)$ must be satisfied, wherein $\arctan(\ )$ in the formula represents arctangent function, and d represents differential, and the condition is to ensure that self lock of the force amplifying transmission mechanism will not occur; and the first working friction pair and the second working friction pair are converted to a theoretically equivalent working friction pair, a tangential external component force in a direction of self lock occurred between the inner ring and the outer ring is $F_1$, and a normal pressure generated on the equivalent working friction pair by an action of the force amplifying transmission mechanism is $F_2$, an equivalent friction coefficient of the equivalent working friction pair is $\mu$, and a design condition for the overrunning clutch to realize a maximum bearing capacity is $dF_1/dF_2 \leq \mu$; and a design condition for the overrunning clutch to achieve overload slipping protection is $dF_1/dF_2 > \mu$, wherein d in the formula represents differential.

Further, the magnetic member is a permanent magnet having an annular shape overall; or the magnetic member includes two sets of permanent magnets which have a preset axial distance from each other, each set of permanent magnets includes a plurality of permanent magnets which are arranged at intervals circumferentially, and one set of permanent magnets is fixed to the first intermediate ring, and the other set of permanent magnets is fixed to the second intermediate ring.

Further, a protruding shoulder is formed at a side of the first intermediate ring that cooperates with the outer ring, and a protruding shoulder is formed at a side of the second intermediate ring that cooperates with the outer ring, and the accommodating space is enclosed by the protruding shoulders of the two intermediate rings and the inner ring.

Further, a protruding shoulder is formed at a side of the first intermediate ring that cooperates with the outer ring, and a protruding shoulder is formed at a side of the second intermediate ring that cooperates with the outer ring, and the accommodating space is enclosed by the protruding shoulders of the two intermediate rings and the inner ring.

Further, the permanent magnet is fixed by bonding or clamping.

The overrunning clutch according to the present application greatly improves various performance indexes of the overrunning clutch; and can also achieve overload protection simply by adjusting the design parameters, thereby enabling the overrunning clutch to have a simpler structure and a lower cost and to be more easily manufactured.

BRIEF DESCRIPTION OF THE DRAWINGS

The present application is further described hereinafter in conjunction with drawings and embodiments.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

First Embodiment

Figure 1:
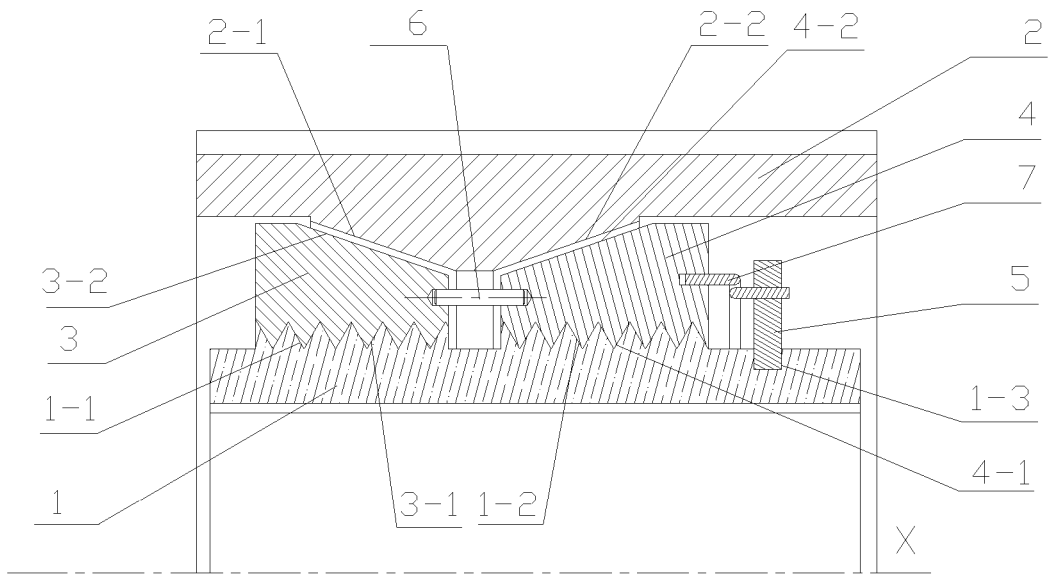
FIG. 1 is a simplified axial sectional view of a conical surface friction type overrunning clutch according to the present application.

A conical surface friction type overrunning clutch of a kind of structure according to the present application shown in FIG. 1 includes an inner ring 1 (or is referred to as an inner ring assembly), an outer ring 2 (or is referred to as an outer ring assembly), a first intermediate ring 3 and a second intermediate ring 4, an intermediate-ring axial position-limiting member 5 and an elastic pre-tightening member 7.

The inner ring 1, the outer ring 2, the first intermediate ring 3 and the second intermediate ring 4 have a common rotation axis, i.e., an axis X shown in the Figure. The inner ring 1 is an integral inner ring, and the reference numeral 1-1 refers to first external screw threads directly processed on an outer circumferential surface of the inner ring 1, and the reference numeral 1-2 refers to second external screw threads directly processed on the outer circumferential surface of the inner ring 1. Furthermore, an annular position-limiting groove 1-3 is arranged on the outer circumferential surface of the inner ring, and a connecting structure, such as straight splines or the like, is directly arranged on an inner circumferential surface of the inner ring, to connect the inner ring with a rotating shaft or the like.

The outer ring 2 is also an integral outer ring. The reference numerals 2-1 and 2-2 refer to conical surfaces directly arranged on an inner circumferential surface of the outer ring. A connecting structure, such as straight splines or the like, is directly arranged on an outer circumferential surface of the outer ring, to connect the outer ring with other components.

The first intermediate ring 3 and the second intermediate ring 4 are both located between the inner ring 1 and the outer ring 2. The reference numeral 3-1 refers to internal screw threads directly arranged on an inner circumferential surface of the first intermediate ring 3, and the reference numeral 3-2 refers to a conical surface directly arranged on an outer circumferential surface of the first intermediate ring 3. The reference numeral 4-1 refers to internal screw threads directly arranged on an inner circumferential surface of the second intermediate ring 4, and the reference numeral 4-2 refers to a conical surface directly arranged on an outer circumferential surface of the second intermediate ring 4. The first intermediate ring 3 cooperates with the outer ring 2 via respective conical surfaces, the second intermediate ring 4 cooperates with the outer ring 2 via respective conical surfaces, and at least one working friction pair, which is axially engageable and disengageable, is formed respectively between the first intermediate ring 3 and the outer ring 2 and between the second intermediate ring 4 and the outer ring 2. A force amplifying transmission mechanism is formed respectively between the intermediate ring 3 and the inner ring 1 and between the second intermediate ring 4 and the inner ring 1, and both the first intermediate ring 3 and the second intermediate ring 4 are connected to the inner ring 1 via the respective force amplifying transmission mechanisms.

In the connecting structure shown in the figure, the internal screw threads 3-1 on the first intermediate ring 3 engage with the first external screw threads 1-1 on the outer circumferential surface of the inner ring 1, and the internal screw threads 4-1 on the second intermediate ring 4 engage with the second external screw threads 1-2 on the outer circumferential surface of the inner ring 1, thereby respectively constituting screw thread pair transmission. The screw thread pair may convert the relative rotation between the first intermediate ring 3 and the inner ring 1 as well as the relative rotation between the second intermediate ring 4 and the inner ring 1 to axial relative displacement, and also convert a relative rotating force to a relative axial force, and allow the relative axial force to be greater than the relative rotating force. The two screw thread pairs are the force amplifying transmission mechanism according to embodiments of the present application, thereby forming a screw thread pair transmission type force amplifying transmission mechanism.

The conical surface 3-2 on the outer circumferential surface of the first intermediate ring 3 cooperates with the conical surface 2-1 on the inner circumferential surface of the outer ring 2, and the conical surface 4-2 on the outer circumferential surface of the second intermediate ring 4 cooperates with the conical surface 2-2 on the inner circumferential surface of the outer ring 2, thereby respectively forming at least one first working friction pair and at least one second working friction pair which are both axially engageable and disengageable, and the conical surfaces are the friction surfaces of the friction pairs.

In order to prevent the first intermediate ring 3 and the second intermediate ring 4 from rotating with respect to each other, (i.e., relative rotation), and allow the two members to rotate synchronously, a synchronizing member 6 is provided between the first intermediate ring 3 and the second intermediate ring 4. The synchronizing member 6 may have various structures. In this embodiment, the synchronizing member 6 is a pin, which has two ends respectively inserted into pin holes of the first intermediate ring 3 and the second intermediate ring 4, or, the synchronizing member 6 may be an inserting member connected to (i.e., arranged on) any one of the first intermediate ring 3 and the second intermediate ring 4 and inserted into an inserting hole correspondingly arranged in the other one of the intermediate rings. The synchronizing member 6 connects the first intermediate ring 3 with the second intermediate ring 4 in a circumferential direction, to ensure that the first intermediate ring 3 and the second intermediate ring 4 do not rotate with respect to each other, and rotate synchronously.

The internal screw threads 3-1 on the first intermediate ring 3 and the internal screw threads 4-1 on the second intermediate ring 4 have opposite turning directions (i.e., the thread directions), thus when being subjected to acting forces from the inner ring 1 and the outer ring 2, the first intermediate ring 3 and the second intermediate ring 4 rotate at the same time and move in opposite directions axially, i.e., moving close to each other at the same time or moving away from each other at the same time.

The intermediate-ring axial position-limiting member 5 is arranged on the inner ring 1 or the outer ring 2, to limit the axial displacement scopes of the first intermediate ring 3 and the second intermediate ring 4. The intermediate-ring axial position-limiting member 5 generally employs an elastic snap spring or the like. In the mounting structure shown in the figure, the intermediate-ring axial position-limiting member 5 cooperates with the annular position-limiting groove 1-3 arranged in the inner ring 1, and is disposed in the annular position-limiting groove.

The elastic pre-tightening member 7 (which may be a torsion spring) is arranged between the intermediate-ring axial position-limiting member 5 and the first intermediate ring 3, or is arranged between the intermediate-ring axial position-limiting member 5 and the second intermediate ring 4. The elastic pre-tightening member 7 has one end in contact with (or connected to) the first intermediate ring 3 or the second intermediate ring 4, and another end connected to the intermediate-ring axial position-limiting member 5, or the elastic pre-tightening member 7 has one end connected to the intermediate ring and another end connected to the inner ring or the outer ring which is connected to the force amplifying transmission mechanism, so as to enable all of the working friction pairs to maintain an elastic pressing force which meets the working requirement when the working friction pairs are not working.

According to this embodiment, the two intermediate rings are positioned between the inner ring 1 and the outer ring 2, and the working friction pair is formed by conical surfaces which have equal cone apex angles (the cone apex angle is an angle formed between two edges at a cone apex). The first working friction pair is formed by the conical surface 3-2 and the conical surface 2-1 which have equal cone apex angles, and the second working friction pair is formed by the conical surface 4-2 and the conical surface 2-2 which have equal cone apex angles. The cone apex angle of the first working friction pair and the cone apex angle of the second working friction pair may be the same or different. The cone apex angles of all the conical surfaces must satisfy the condition in the claims, and choosing the parameters of the condition in the claims is to achieve an effect that when an external force disappears, an additional pressure between the friction pair disappears accordingly, i.e., self lock of the working friction pair would not occur.

According to this embodiment, the first force amplifying transmission mechanism is constituted by a screw thread pair which is formed by the internal screw threads 3-1 on the first intermediate ring 3 and the first external screw threads 1-1 on the outer circumferential surface of the inner ring 1 engaging with each other, and the second force amplifying transmission mechanism is constituted by a screw thread pair which is formed by the internal screw threads 4-1 on the second intermediate ring 4 and the second external screw threads 1-2 on the outer circumferential surface of the inner ring 1 engaging with each other. The screw thread pairs also must satisfy the condition in the claims, i.e., must ensure that self lock of the screw thread pair will not occur. The screw thread pairs are preferably embodied as trapezoidal screw threads or a rectangular screw threads, to achieve the object of high transmission efficiency and high structural strength.

Apparently, the screw thread pairs may further be embodied as any screw thread structure which has a standard or nonstandard cross section according to requirements or a status limited by conditions.

Although the elastic pre-tightening member 7 is embodied as a torsion spring according to this embodiment, since the force amplifying transmission mechanism according to the present application will not lock itself, the elastic pre-tightening of the working friction pair may be realized by using an elastic pre-tightening member which applies an axial force, for example, a belleville spring, a rubber spring and other elastic members.

In engineering design, all the first working friction pair and the second working friction pair can be converted equivalently to a theoretically equivalent working friction pair, a tangential external component force in a direction of self lock occurred between the inner ring and the outer ring is indicated as F1, and a normal pressure generated on the equivalent working friction pair is indicated as F2, an equivalent friction coefficient of the equivalent working friction pair is indicated as μ, and when a condition of $dF_1/dF_2 \le \mu$, is satisfied, the overrunning clutch according to the present application may maintain a function of an overrunning clutch within a scope of load bearing capacity, and when a condition of $dF_1/dF_2 > \mu$ is satisfied, the overrunning clutch according to the present application can achieve a function of overload slipping protection. The d in the above formulas represents differential.

In a case that the overrunning clutch according to the present application satisfies the above condition of $dF_1/dF_2 \le \mu$, the working process is described as follows. Via the elastic pre-tightening member 7 (for example, the torsion spring) and the axial position-limiting elastic snap spring 5, the first working friction pair and the second working friction pair both constituted by conical surfaces are both allowed to be in contact state at the same time and have a proper initial elastic pressing force. When the inner ring 1 and the outer ring 2 rotate with respect to each other or have a tendency to rotate with respect to each other, if the rotating direction or tendency causes the first intermediate ring 3 and the second intermediate ring 4 to press the working friction pairs increasingly tight by the interaction of the screw thread pair formed by the screw threads 1-1 engaging with the screw threads 3-1 and the screw thread pair formed by the screw threads 1-2 engaging with the screw threads 4-1, the working friction pairs will maintain a stationary state, i.e., self lock is achieved. Conversely, if the above relative rotation or rotation tendency is in an opposite direction, the first intermediate ring 3 or the second intermediate ring 4 may further reduce the initial pressure of the working friction pair through the interaction of the above screw thread pairs, and slipping of the working friction pair will occur, which is the overrunning state. As illustrated, the overrunning clutch achieves one-way force transmission in the rotating direction.

In order to enable the overrunning clutch according to the present application to work normally, a proper lubrication is required, thus it is preferable to provide on the friction surfaces of the working friction pairs with lubrication channels such as a reticulate pattern or a 8-shaped oil groove.

Since the overrunning clutch according to the present application has a simple structure, when working, a roller bearing or a sliding bearing for supporting or positioning is required to be provided between the inner ring 1 and the outer ring 2 or between the parts which are respectively connected with the inner ring 1 and the outer ring 2, i.e., the roller bearing and the sliding bearing function as a position restricting assembly, and can further seal the lubricant.

If the use conditions of this embodiment permit, the axial position-limiting elastic snap spring 5 can also be canceled, and the elastic pre-tightening member 7 (for example the torsion spring) can be directly retained into a position-limiting hole in the inner ring 1.

If the use conditions of this embodiment permit, the straight splines on the inner ring 1 and the outer ring 2 may also be changed into keyways, or can be canceled, and the inner ring 1 may also be made as a solid inner ring, which can then be referred to as an inner shaft.

The force amplifying transmission mechanism may be constituted by a structural shape directly formed on the intermediate rings directly engaging with a structural shape directly formed on the inner ring or the outer ring which is connected to the force amplifying transmission mechanism. The structural shapes may be any one of the following structural shapes, including screw threads having a standard cross section or a nonstandard cross section, an axial helical surface, and an axial inclined wedge surface. The force amplifying transmission mechanism may also be formed by a structural shape directly formed on the intermediate rings, a structural shape directly formed on the inner ring or the outer ring which is connected to the force amplifying transmission mechanism, and other parts located between the two structural shapes, and may be one of an axial helical groove-pin structure, an axial inclined supporting bar structure, an axial wedging structure with two steel balls, an axial wedging structure with two rollers, and a rolling thread structure. While converting the movement, the force amplifying transmission mechanism divides the tangential force between the intermediate ring and the inner ring to generate an axial component force between the intermediate ring and the inner ring.

This embodiment employs a screw thread pair type force amplifying transmission mechanism, and a lead angle is indicated as $\psi$, and a self-lock angle of the screw thread pair is indicated as $\rho$, and according to conditions of the present application, at least one screw thread pair must satisfy the condition of $\psi > \rho$, to ensure that this screw thread pair works in a non self-lock range.

Each of the working friction pairs may be a structure constituted by two friction surfaces which are formed by solely two conical surfaces cooperating with each other, and also may be a structure constituted by more than two friction surfaces formed by conical surfaces staggeredly stacked according to a configuration of a conventional multi-plate clutch.

The elastic pre-tightening member 7 includes at least one elastic element made by elastic material such as metal or rubber, and the structure of the elastic element may be a torsion spring, a pressing spring, a disc spring, a wave spring or a leaf spring.

At least one position restricting assembly is connected to the inner ring and the outer ring, to restrict a radial relative position and an axial relative position between the inner ring and the outer ring. The position restricting assembly may be embodied as common structures, such as a roller bearing, a sliding bearing and a hydraulic bearing. The position restricting assembly can be directly arranged between the inner ring and the outer ring of the overrunning clutch, and can also be arranged between external mechanism parts which are connected to the inner ring and the outer ring of the overrunning clutch.

It is to be noted that, the one-way bearing has less parts, a simple structure, and obviously a very good manufacturability, a small slipping angle, a strong bearing capability, and processing precision of which can be easily ensured. Though the processing precision is low, it only has slight impact on the slipping angle and the bearing capacity, and has nearly no impact on the one-way overrunning function.

The above-described overrunning is a state that the direction of the above tangential external component force in this state is opposite to that in the self-lock state. This embodiment employs a force amplifying transmission mechanism of a screw thread pair structure, which allows the pressure between the friction surfaces of the working friction pair to be reduced actively. When the tangential external component force in that direction is larger than the friction force between the friction pair, the inner ring 1 and the outer ring 2 may rotate with respect to each other about the common rotation axis X, and the overrunning clutch is in an overrunning state.

When the overrunning clutch is in the overrunning state, the tangential external component force in that direction can only transmit a force, which is less than or equal to the maximum friction force between the friction pair, between the inner ring 1 and the outer ring 2. The maximum friction force between the friction pair in the overrunning state may be converted to a torque, and this torque is just the commonly referred overrunning torque of the overrunning clutch.

Generally a transition process of an overrunning clutch from a self-lock state to an overrunning state is referred to as unlocking, and the conical surface friction type overrunning clutch according to the present application has no individual self lock mechanism, thus active unlocking may be achieved by using the screw thread pair type two-way force amplifying transmission mechanism, which is also one of aspects of the present application.

In addition, in the conical surface friction type overrunning clutch according to the present application, all the working friction pairs are of a surface contact structure, thus in the overrunning working state, a lubricant oil film can be easily formed between the friction surfaces of the working friction pair, which enables the wear between the friction surfaces of the working friction pair to be close to zero. Thus, the conical surface friction type overrunning clutch according to the present application can operate in the high speed overrunning state for a long time, which is also one of features of the present application.

Based on the above description of the force amplifying transmission mechanism, if the screw thread pair type force amplifying transmission mechanism is used, the conical surface friction type overrunning clutch according to the present application can automatically compensate the wear of the working friction pair in a large scope, thus the functional characters of this structure is less sensitive to the variation of the parameters of parts, which is also one of features of the present application.

The conical surface friction type overrunning clutch according to the present application may achieve structure characteristics of almost fully axially symmetric and fully rigid, so as to adapt to high speed and ultra high speed operation, and the highest rotating speed only depends on the strength of the material, the magnitude of the transmitted torque, and the level of dynamic balance.

According to the description of the related documents in the technical background of the present application, the maximum slipping angle may be understood as follows. If an angle of the relative position between the rotating directions of the inner ring 1 and the outer ring 2 at a moment that the inner ring 1 and the outer ring 2 transit to a relative stationary moment from an overrunning state is 0, and when the inner ring 1 and the outer ring 2 transit to a bearing capacity state, a relative angle by which the inner ring 1 and the outer ring 2 rotate with respect to each other is the maximum slipping angle.

The maximum slipping angle of the conical surface friction type overrunning clutch according to the present application mainly depends on the fitting clearance and fitting precision of the force amplifying transmission mechanism, and a thickness of the oil film between the friction surfaces of all the working friction pairs at the angle 0, the structural elastic deformation amount after self-lock, and a period for transiting to the self-lock state and etc. Via corresponding technical means, the first three factors impacting the maximum sipping angle may be easily controlled within a required range.

Based on the above schematic views and all the illustrations and descriptions, ordinary technical personnel in the field may easily understand the technical principle for the conical surface friction type overrunning clutch according to the present application to achieve self-lock and overrunning, and may find the structural characteristics and improvement degree of technical indexes of the present application, and using effects, huge social benefits and economic benefits caused from this, and can easily and simply copy the technical principle.

Of course, many other structure forms having the function of the overrunning clutch may be derived from the above basic structure form, and a part of modified structures will be described and explained in the following embodiments.

Figure 2:
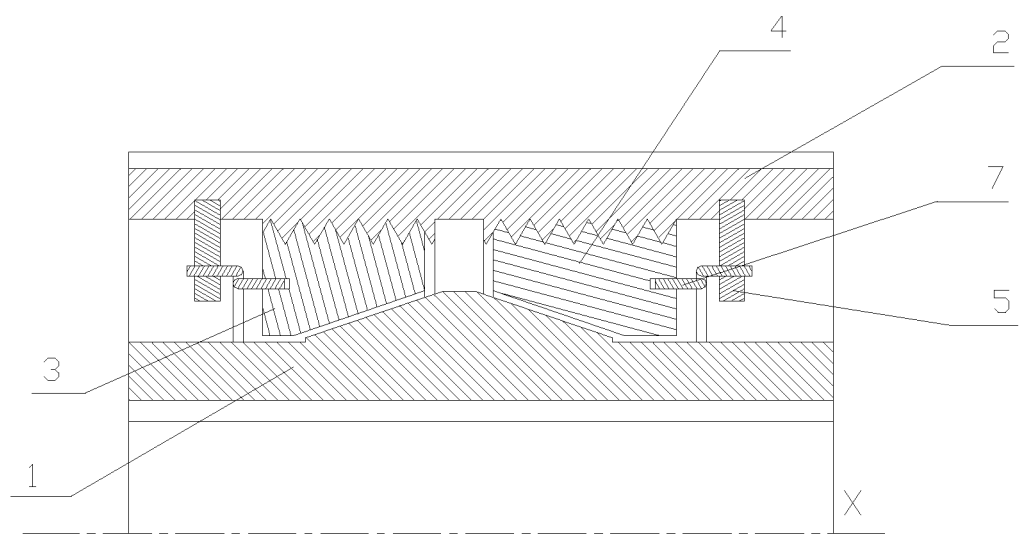
FIG. 2 is a simplified axial sectional view of a conical surface friction type overrunning clutch of a second kind of structure according to the present application.

The second kind of structure of the conical surface friction type overrunning clutch according to the present application is shown in FIG. 2, and the same part between the second kind of structure and the structure in FIG. 1 will not be described herein, and the difference therebetween lies in that, in the second kind of structure, a force amplifying transmission mechanism is respectively formed between the outer ring 2 and the first intermediate ring 3, and between the outer ring 2 and the second intermediate ring 4, and screw thread pair type force amplifying transmission mechanisms are formed by engaged screw threads of the outer ring 2 and the first intermediate ring 3, and engaged screw threads of the outer ring 2 and the second intermediate ring 4. The inner ring 1 and the first intermediate ring 3, as well as the inner ring 1 and the second intermediate ring 4, cooperate with each other by conical surfaces, thereby respectively forming a first working friction pair and a second working friction pair. An intermediate-ring axial position-limiting member 5 and an elastic pre-tightening member 7 are provided between the first intermediate ring 3 and the outer ring 2, as well as between the second intermediate ring 4 and the outer ring 2, thereby allowing both the first working friction pair and the second working friction pair formed by conical surfaces to maintain in contact state at the same time and have a proper initial elastic pressing force. In FIG. 2, no synchronizing member 6 is provided between the first intermediate ring 3 and the second intermediate ring 4.

Figure 3:
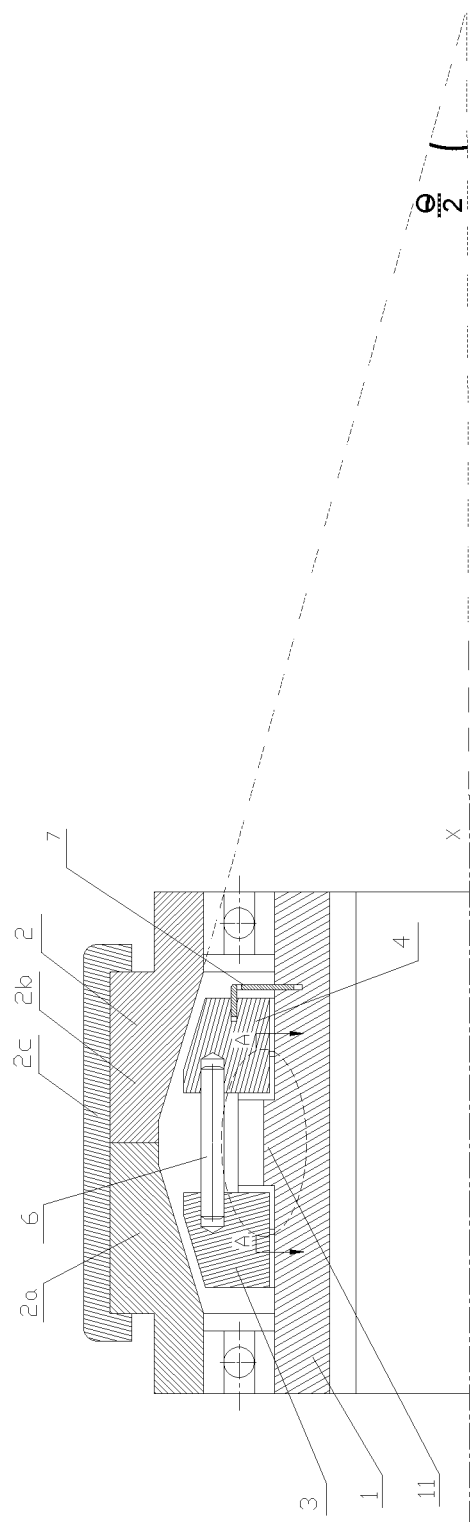
FIG. 3 is a simplified axial sectional view of a conical surface friction type overrunning clutch of a third kind of structure according to the present application.
Figure 4:
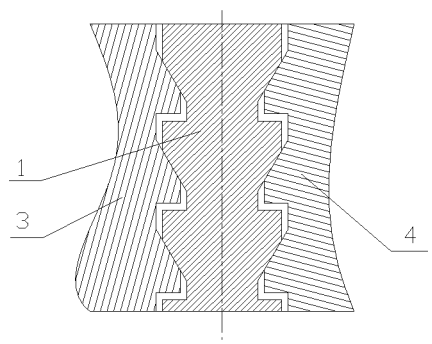
FIG. 4 is an expanded revolved sectional view of FIG. 3 taken along line A-A and taking an axis X as the rotation axis.

A third kind of structure of the conical surface friction type overrunning clutch according to the present application is shown in FIGS. 3 and 4, the same part between the third kind of structure and the first two structures will not be described herein, and the difference therebetween lies in that, in the third kind of structure, a boss 11 is provided at a middle portion of the inner ring 1, and the first intermediate ring 3 and the second intermediate ring 4 are respectively arranged at two sides of the boss 11, and are generally symmetrically arranged at the two sides of the boss 11. The inner ring 1 and an end surface of the first intermediate ring 3 as well as the inner ring 1 and an end surface of the second intermediate ring 4 are respectively connected via a force amplifying transmission structure having an axial inclined wedge surface. When the inner ring 1 rotates, the first intermediate ring 3 and the second intermediate ring 4 are pushed by the inclined wedge surfaces at the end surfaces to move axially, and to symmetrically move at the right side and the left side of the boss 11. In order to facilitate mounting, the outer ring 2 is an outer ring assembly constituted by three parts, and the left part in the figure is referred to as 2*a*, the right part is referred to as 2*b*, and the reference numeral 2*c* refers to a connector (or a cap) which connects the left part 2*a* with the right part 2*b* to form an integral structure, thereby forming the outer ring assembly.

Figure 5:
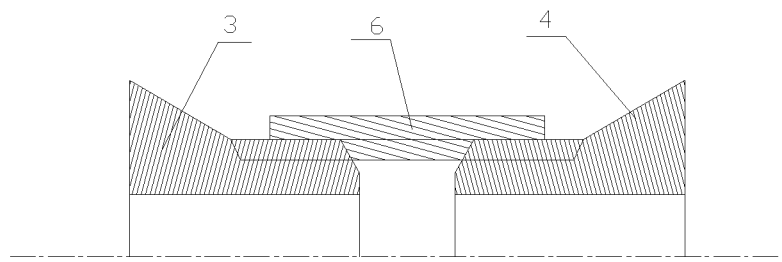
FIG. 5 shows the structure of an embodiment of a synchronizing member (member 6) of an intermediate ring synchronizing rotary mechanism according to the present application.
Figure 6:
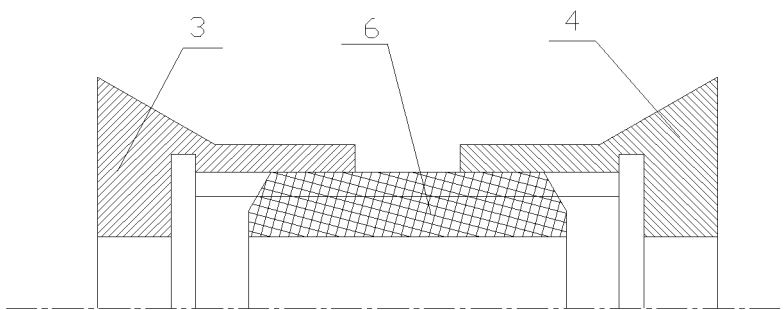
FIG. 6 shows the structure of a second embodiment of the synchronizing member (member 6) of the intermediate ring synchronizing rotary mechanism according to the present application.
Figure 7:
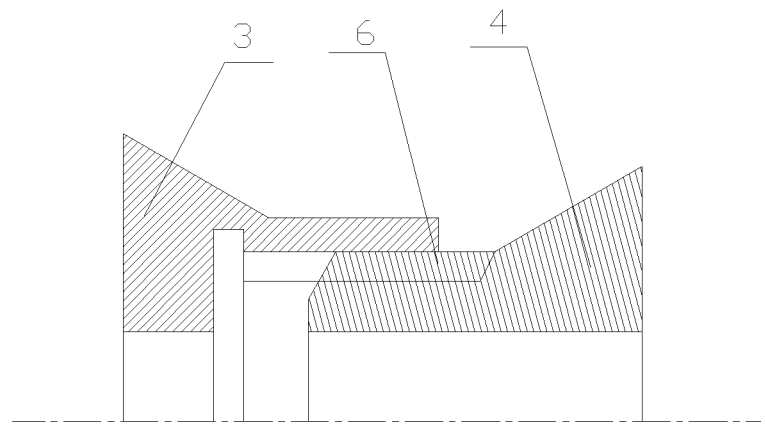
FIG. 7 shows the structure of an embodiment of the intermediate ring synchronizing rotary mechanism without the synchronizing member (member 6) according to the present application.
Figure 8:
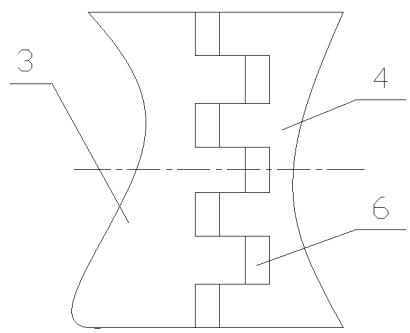
FIG. 8 shows the structure of a second embodiment of the intermediate ring synchronizing rotary mechanism without the synchronizing member (member 6) according to the present application.

The synchronizing member 6 according to the present application shown in FIGS. 5 to 8 is arranged between the first intermediate ring 3 and the second intermediate ring 4, to ensure that the first intermediate ring 3 and the second intermediate ring 4 rotate synchronously and do not rotate with respect to each other. The synchronizing member 6 has various structures in addition to the configuration shown in FIGS. 1 and 3 using the cooperation between a cylinder pin and a hole. FIG. 5 shows a configuration in which a circular ring with an inner hole being provided with a straight key engages with a straight groove formed in the outer circumferential surface of the intermediate ring. FIG. 6 shows a configuration in which a circular ring with an outer circumferential surface being provided with a straight key engages with a straight groove formed in the inner circumferential surface of the intermediate ring. The synchronizing member 6 shown in FIGS. 7 and 8 is constituted by geometrical configurations directly formed on the intermediate rings, FIG. 7 shows a configuration in which a straight key and a straight groove are directly formed on the two intermediate rings respectively, and the straight key or the straight groove formed in one of the two intermediate rings is inserted into the straight groove or the straight key correspondingly formed in the other one of the two intermediate rings. FIG. 8 shows a structure in which a straight tooth and a tooth groove matching with each other are respectively formed on end surfaces of the two intermediate rings.

Figure 9:
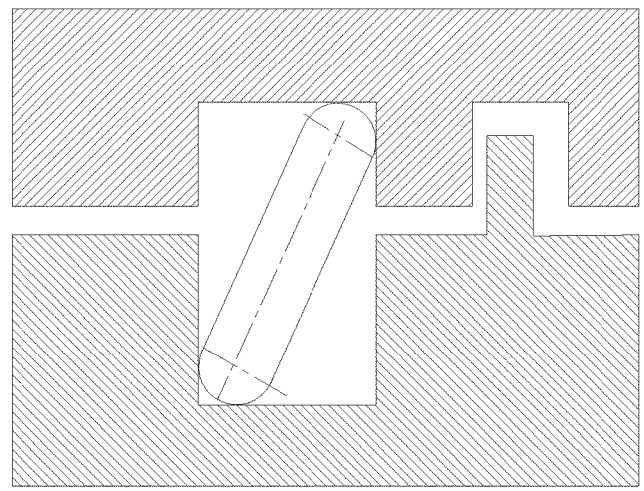
FIG. 9 shows the structure of an embodiment of a force-amplifying transmission mechanism according to the present application.
Figure 10:
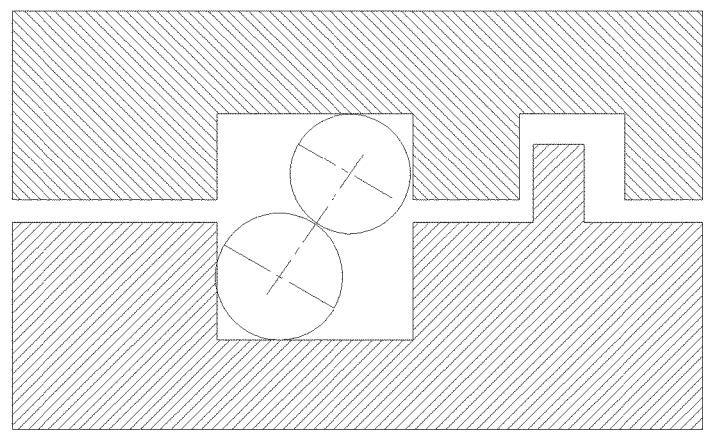
FIG. 10 shows the structure of a second embodiment of a force-amplifying transmission mechanism according to the present application.

Structures of a force amplifying transmission mechanism are shown in FIGS. 9 and 10. FIG. 9 shows a force amplifying transmission mechanism of an axial inclined supporting bar structure, which is arranged between the first intermediate ring 3 and the inner ring 1 or between the first intermediate ring 3 and the outer ring 2, or between the second intermediate ring 4 and the inner ring 1 or between the second intermediate ring 4 and the outer ring 2, to replace the above screw thread pair type force amplifying transmission mechanism, and this structure may also realize the object of the present application. FIG. 10 shows a force amplifying transmission mechanism of an axial wedging structure having a dual steel ball or dual roller structure, which is arranged between the first intermediate ring 3 and the inner ring 1 or between the first intermediate ring 3 and the outer ring 2, or between the second intermediate ring 4 and the inner ring 1 or between the second intermediate ring 4 and the outer ring 2, to replace the above screw thread pair type force amplifying transmission mechanism, and this structure may also realize the object of the present application.

Furthermore, in addition to the elastic pre-tightening member, a magnetic member may also be adopted to achieve the pre-tightening requirement.

Figure 11:
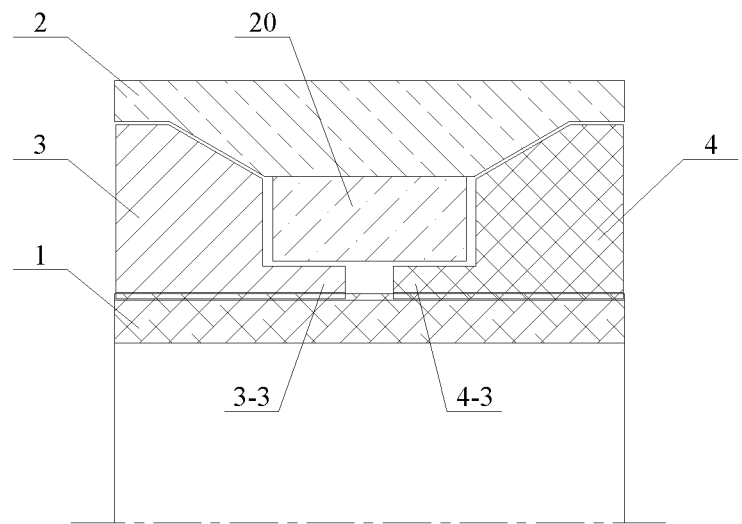
FIG. 11 is a simplified axial sectional view of the conical surface friction type overrunning clutch of a fourth kind of structure according to the present application.
Figure 12:
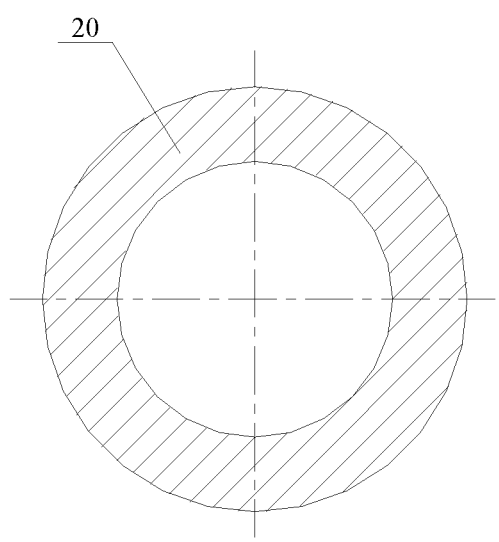
FIG. 12 is a schematic view of an annular permanent magnet shown in FIG. 11.

Reference is made to FIGS. 11 and 12. FIG. 11 is a simplified axial sectional view showing a fourth kind of structure of the conical surface friction type overrunning clutch according to the present application; and FIG. 12 is a schematic view of an annular permanent magnet shown in FIG. 11.

The same part between the fourth kind of structure of the conical surface friction type overrunning clutch according to the present application shown in FIG. 11 and the structure shown in FIG. 1 will not be described herein, and the difference therebetween lies in that, in the fourth kind of structure, an accommodating space for accommodating the permanent magnet 20 is arranged between the first intermediate ring 3 and the second intermediate ring 4. The permanent magnet 20 is in an annular shape overall and may be fixed to the outer ring 2 by bonding or clamping. A protruding shoulder 3-3 is formed at a side of the first intermediate ring 3 that cooperates with the inner ring 1, and a protruding shoulder 4-3 is formed at a side of the second intermediate ring 4 that cooperates with the inner ring 1, and the accommodating space is enclosed by the protruding shoulders of the two intermediate rings and the outer ring 2, to adapt to the high speed rotation.

Figure 13:
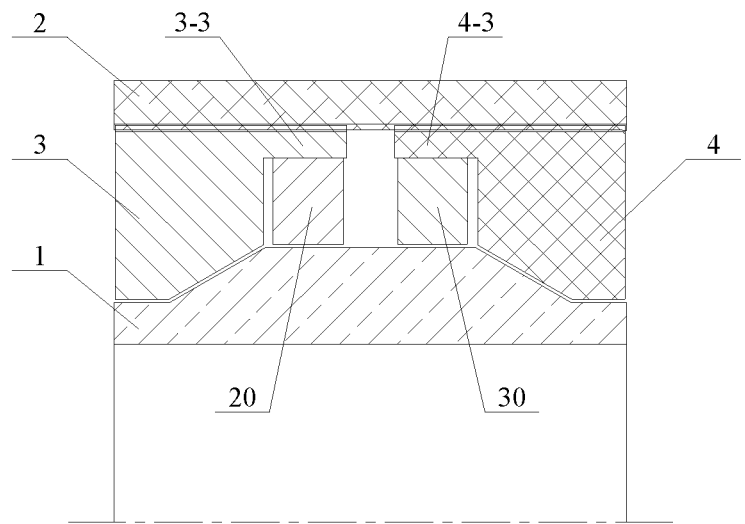
FIG. 13 is a simplified axial sectional view of the conical surface friction type overrunning clutch of a fifth kind of structure according to the present application.
Figure 14:
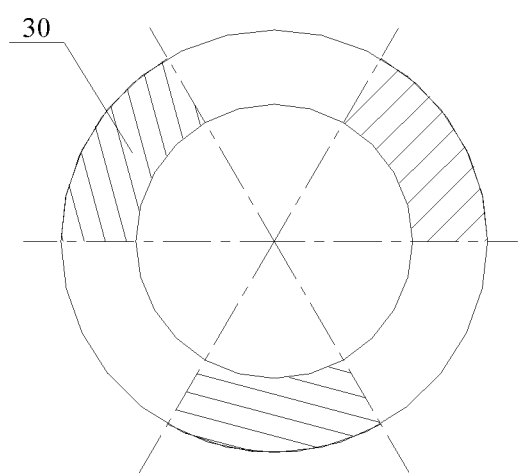
FIG. 14 is a schematic view of a circumferentially arranged permanent magnet shown in FIG. 13.

Reference is made to FIGS. 13 and 14. FIG. 13 is a simplified axial sectional view showing a fifth kind of structure of the conical surface friction type overrunning clutch according to the present application; and FIG. 14 is a schematic view of a circumferentially arranged permanent magnet shown in FIG. 13.

Similarly, the fifth kind of structure of the conical surface friction type overrunning clutch shown in FIG. 13 employs a magnetic member to provide the pre-tightening force. The main configuration of the fifth kind of structure is the same as the structure shown in FIG. 2. Unlike the structure shown in FIG. 2, in the fifth kind of structure, an accommodating space is formed between the first intermediate ring 3 and the second intermediate ring 4, to accommodate two sets of permanent magnets 30 which have a preset axial distance from each other. Each set of the permanent magnets 30 include multiple permanent magnets arranged at intervals circumferentially, and one set of permanent magnets 30 are fixed to the first intermediate ring 3, and the other set of permanent magnets are fixed to the second intermediate ring 4, and each permanent magnet may be fixed to the respective intermediate ring by bonding or clamping. A protruding shoulder 3-4 is formed at a side of the first intermediate ring 3 that cooperates with the outer ring 2, and a protruding shoulder 4-4 is formed at a side of the second intermediate ring 4 that cooperates with the outer ring 2, and the accommodating space is enclosed by the protruding shoulders of the two intermediate rings and the inner ring 1, to adapt to the high speed rotation.

Obviously, in addition to the permanent magnet, theoretically, the electromagnet can also meet the above using requirement of providing the pre-tightening force by magnetic force.

It is to be particularly noted that, in the above fourth and fifth solutions of the conical surface friction type overrunning clutch, the structure of the permanent magnet may be changed according to practical requirements, for example, the separated-type permanent magnet and its connecting structure shown in FIG. 14 may be applied in the fourth kind of conical surface friction type overrunning clutch shown in FIG. 11, and the integrated-type permanent magnet and its connecting structure shown in FIG. 12 may also be applied in the fifth kind of conical surface friction type overrunning clutch shown in FIG. 13.

It is to be noted finally that, the above embodiments are only intended to illustrate technical solutions of the present application rather than a limitation to the present application. Though the present application is described in detail with reference to the preferred embodiments, it should be appreciated by the person skilled in the art that, a few of modifications or equivalent substitutions may be made to the technical solutions of the present application without departing from the principle and scope of the technical solutions of the present application, and these modifications or equivalent substitutions are also deemed to fall into the scope of the present application defined by the claims.

The invention claimed is:

1. A conical surface friction type overrunning clutch, comprising: an inner ring, an outer ring, a first intermediate ring, a second intermediate ring, and an elastic pre-tightening member; wherein, the inner ring, the outer ring, the first intermediate ring and the second intermediate ring have a common rotation axis;

the first intermediate ring and the second intermediate ring are both located between the inner ring and the outer ring; a boss is provided on a middle portion of the inner ring, and the first intermediate ring and the second intermediate ring are respectively arranged at two sides of the boss of the inner ring; the first intermediate ring and the second intermediate ring each cooperates with the outer ring via conical surfaces, to respectively form at least one first working friction pair and at least one second working friction pair which are both axially engageable and disengageable; and a first force amplifying transmission mechanism and a second force amplifying transmission mechanism are respectively formed between the first intermediate ring and the inner ring and between the second intermediate ring and the inner ring, and the first intermediate ring and the second intermediate ring are respectively connected to the inner ring via the first force amplifying transmission mechanism and the second force amplifying transmission mechanism; and each of the force amplifying transmission mechanisms is constituted by a structural shape directly formed on the respective intermediate ring directly engaging with a structural shape directly formed on the boss of the inner ring, and each of the structural shapes is an axial inclined wedge surface;

the elastic pre-tightening member has one end arranged on the first intermediate ring or the second intermediate ring, to allow all the working friction pairs to maintain an elastic pressing force which meets a working requirement when the working friction pairs are not working;

the first working friction pair and the second working friction pair have a common rotation axis, and two conical surfaces of each working friction pair that cooperate with each other have equal cone apex angles; for the cone apex angle of any one of the working friction pairs, the cone apex angle referred to as θ and a friction coefficient of the friction pair referred to as $\mu_0$ must satisfy a condition of 2 arctan($\mu_0$)<θ≤180°, wherein arctan( ) in the formula represents arctangent function, and the condition is to ensure that self lock of the working friction pair will not occur;

at least one of the force amplifying transmission mechanisms is configured to convert a relative rotation arc length between the respective intermediate ring and the inner ring or the outer ring which is connected to the respective force amplifying transmission mechanism to an axial relative displacement, and in a case that the relative rotation arc length is φ, and the generated axial relative displacement is λ, and the friction coefficient of the respective force amplifying transmission mechanism is $\mu_1$, a condition of arctan(dλ/dφ)>arctan($\mu_1$) must be satisfied, wherein arctan( ) in the formula represents arctangent function, and d represents differential, and the condition is to ensure that self lock of the respective force amplifying transmission mechanism will not occur; and in a case that the first working friction pair and the second working friction pair are converted to a theoretically equivalent working friction pair, a tangential external component force in a direction of self lock occurred between the inner ring and the outer ring is $F_1$, and a normal force generated on the equivalent working friction pair by an action of the respective force amplifying transmission mechanism is $F_2$, an equivalent friction coefficient of the equivalent working friction pair is μ, and a design condition for the overrunning clutch to realize a maximum bearing capacity is $dF_1/dF_2 \leq \mu$; and a design condition for the overrunning clutch to achieve overload slipping protection is $dF_1/dF_2 > \mu$, wherein d in the formula represents differential.

2. The conical surface friction type overrunning clutch according to claim 1,
wherein, while converting the movement, the force amplifying transmission mechanism divides a tangential force between the intermediate ring and the inner ring or the outer ring to generate an axial component force between the intermediate ring and the inner ring or the outer ring.

3. The conical surface friction type overrunning clutch according to claim 1, wherein in the force amplifying transmission mechanisms, in a case that the intermediate rings rotate with respect to the inner ring or the outer ring which is connected to the force amplifying transmission mechanisms, the two intermediate rings move in opposite directions axially, i.e., moving close to each other at the same time or moving away from each other at the same time.

4. The conical surface friction type overrunning clutch according to claim 1, wherein, the elastic pre-tightening member is arranged between the intermediate-ring axial position-limiting member and the first intermediate ring, or is arranged between the intermediate-ring axial position-limiting member and the second intermediate ring, or is connected to a respective intermediate ring and the inner ring or the outer ring which is connected to the force amplifying transmission mechanisms, to enable all of the working friction pairs to maintain the elastic pressing force which meets the working requirement when the working friction pairs are not working.

5. The conical surface friction type overrunning clutch according to claim 1, wherein the elastic pre-tightening member comprises at least one elastic element made from elastic material such as metal or rubber, and the structure of the elastic element comprises a torsion spring, a pressing spring, a disc spring, a wave spring and a leaf spring.

6. The conical surface friction type overrunning clutch according to claim 1, wherein a synchronizing mechanism is provided between the first intermediate ring and the second intermediate ring to allow the two members to rotate synchronously, the synchronizing mechanism is constituted by straight teeth or splines which are provided on end surfaces, inner circumferential surfaces, or outer circumferential surfaces of the two intermediate rings and are engaged with each other, or is constituted by a cylindrical pin connecting with holes on the end surfaces of the two intermediate rings, or is constituted by straight teeth or splines provided on inner circumferential surfaces or outer circumferential surfaces of the two intermediate rings engaging with a circular ring which is provided with a straight groove or splines on an inner circumferential surface or an outer circumferential surface.

7. The conical surface friction type overrunning clutch according to claim 1, wherein, at least one position restricting assembly is connected to the inner ring and the outer ring, to restrict or limit a radial relative position and an axial relative position between the inner ring and the outer ring.

8. The conical surface friction type overrunning clutch according to claim 7, wherein the position restricting assembly has a common structure, comprising a roller bearing, a sliding bearing and a hydraulic bearing, and the position restricting assembly is allowed to be arranged directly between the inner ring and the outer ring of the overrunning clutch, and also to be arranged between parts of external mechanism which are connected to the inner ring and the outer ring of the overrunning clutch.

9. The conical surface friction type overrunning clutch according to claim 2, wherein in the force amplifying transmission mechanisms, in a case that the intermediate rings rotate with respect to the inner ring or the outer ring which is connected to the force amplifying transmission mechanisms, the two intermediate rings move in opposite directions axially, i.e., moving close to each other at the same time or moving away from each other at the same time.

10. The conical surface friction type overrunning clutch according to claim 2, wherein, the elastic pre-tightening member is arranged between the intermediate-ring axial position-limiting member and the first intermediate ring, or is arranged between the intermediate-ring axial position-limiting member and the second intermediate ring, or is connected to a respective intermediate ring and the inner ring or the outer ring which is connected to the force amplifying transmission mechanisms, to enable all of the working friction pairs to maintain the elastic pressing force which meets the working requirement when the working friction pairs are not working.

11. The conical surface friction type overrunning clutch according to claim 2, wherein the elastic pre-tightening member comprises at least one elastic element made by elastic material such as metal or rubber, and the structure of the elastic element comprises a torsion spring, a pressing spring, a disc spring, a wave spring and a leaf spring.

12. The conical surface friction type overrunning clutch according to claim 2, wherein, at least one position restricting assembly is connected to the inner ring and the outer ring, to restrict or limit a radial relative position and an axial relative position between the inner ring and the outer ring.

\* \* \* \* \*